United States Patent [19]
Limaye

[11] Patent Number: 5,488,018
[45] Date of Patent: Jan. 30, 1996

[54] ULTRA LOW THERMAL EXPANSION, HIGHLY THERMAL SHOCK RESISTANT CERAMIC

[76] Inventor: Santosh Y. Limaye, 1440 Sandpiper Cir. #38, Salt Lake City, Utah 84117

[21] Appl. No.: 341,732

[22] Filed: Apr. 21, 1989

[51] Int. Cl.$^6$ ............................................. C04B 35/48
[52] U.S. Cl. .................. 501/104; 501/102; 501/103; 501/106; 501/123; 423/306
[58] Field of Search ..................... 501/94, 102, 104, 501/106, 123, 134, 135, 133, 103; 35/48; 423/306; C04B 35/48

[56] References Cited

U.S. PATENT DOCUMENTS

| | | |
|---|---|---|
| 3,881,945 | 5/1975 | Trojer et al. |
| 3,954,525 | 5/1976 | Myles et al. |
| 4,247,249 | 1/1981 | Siemers |
| 4,306,909 | 12/1981 | Oda et al. |
| 4,307,198 | 12/1981 | Oda et al. |
| 4,316,965 | 2/1982 | Oda et al. |
| 4,526,844 | 7/1985 | Yoldas et al. |
| 4,587,172 | 5/1986 | Roy et al. |
| 4,675,302 | 6/1987 | Roy et al. |
| 4,690,911 | 9/1987 | Nakada ............................ 501/105 |

(List continued on next page.)

FOREIGN PATENT DOCUMENTS

| | | |
|---|---|---|
| 0260893 | 9/1987 | European Pat. Off. |
| 0306242 | 8/1988 | European Pat. Off. |
| 807028 | 9/1988 | WIPO |

OTHER PUBLICATIONS

Aitken, "NZP Glass–Ceramics", XV International Congress on Glass, Leningrad, vol. 3a, Glass Technology and Application, (1989), pp. 96–101. No Month.

Bergeron et al., "Introduction to Phase Equilibria in Ceramics", (1984), pp. 32–38. No Month.

Chemical Abstracts, 95:11516k, vol. 95, (1981), p. 276. No Month.

Limaye, "Thermal Expansion of Alkaline Earth Zirconium Phosphates A Thesis in Ceramic Science", The Pennsylvania State University, (Dec. 1986.).

Yamai et al., "Low–Thermal Expansion Polycrystalline Zirconyl Phosphate Ceramic", Journal of the American Ceramic Society, vol. 68, No. 5, (May 1985), pp. 273–278.

"The Crystal Structure of $KZr_2(PO_2)_3$," M. Sljukic, et al, Published by Washington State University (pp. 148–161) (1969) No Month.

"Phase Transformation in $Na_{1+x}Si_xZr_2P_{3-x}O_{12}$ Compounds" By J. P. Boilot, et al., Materials Research Bulletin, vol. 14, pp. 1469–1477, (1979) No Month.

"Ultralow–Expansion Ceramics in the System $Na2O-ZrO2-P2O_5-SiO2$" by J. Alamo, et al., Communications of the American Ceramic Society, pp. C78–C80 (May/1984).

"Revision of Chrstalline Phases in the System $ZrO2-P2O_5$" by James Alamo, et al. Communications of the American Ceramic Society, pp. C80–C82. (1986) No Month.

"Crystal Chemistry of the $NaZr(PO_4)_3$ NZP or CTP Structure Family" by James Alamo et al., Jr. Mat. Science, pp. 444–450 (1986) No Month.

"Synthesis and Sintering of $Ca_{0.5}Zr_2P_3O_{12}$–A Low Thermal Expansion Material" by D. K. Agrawal, et al., Material Research Bulletin, pp. 99–106 (1985) No Month.

"Thermal Expansion Behavior of $NaZr_2(PO_4)_3$–Type Compounds" by Toshitaka Oota et al., Jr. of the American Ceramic Society, p. 106 (Jan. 1986).

"Synthesis and Thermal Expansion of $MZr_4P_6O_{24}$ (M–Mg, Ca, Sr, Ba)" by S. Y. Limaye, Communications of the American Ceramic Society, pp. C32–C36 (Oct. 1987).

*Primary Examiner*—Mark L. Bell
*Assistant Examiner*—Paul Marcantoni

[57] ABSTRACT

Three families of ceramic compositions having the given formula: $\phi_{1+x}Zr_4P_{6-2x}Si_{2x}O_{24}$, $\phi_{1+x}Zr_{4-2x}Y_{2x}P_6O_{24}$ and $\phi_{1+x}Zr_{4-x}Y_xP_{6-2x}Si_xO_{24}$ wherein $\phi$ is either Strontium or Barium and X has a value from about 0.2 to about 0.8 have been disclosed. Ceramics formed from these compositions exhibit very low, generally near neutral, thermal expansion over a wide range of elevated temperatures.

19 Claims, 7 Drawing Sheets

U.S. PATENT DOCUMENTS

| | | |
|---|---|---|
| 4,698,318 | 10/1987 | Vogel et al. . |
| 4,703,023 | 10/1987 | Yamai .................................... 501/102 |
| 4,748,138 | 5/1988 | Watanabe et al. ...................... 501/105 |
| 4,784,976 | 11/1988 | Aitken . |
| 4,801,566 | 1/1989 | Limaye et al. . |
| 4,804,645 | 2/1989 | Elkstrom .................................... 501/95 |
| 4,883,781 | 11/1989 | Watanabe et al. . |
| 4,888,312 | 12/1989 | Watanabe et al. . |
| 4,925,816 | 5/1990 | Watanabe et al. ...................... 501/102 |
| 4,968,648 | 11/1990 | Watanabe et al. . |

ULTRA LOW THERMAL EXPANSION, HIGHLY THERMAL SHOCK RESISTANT CERAMIC

Government Rights Contract Section: This invention was made with Government support under contract no. DE-AC05-87ER80502, awarded by the Department of Energy. The Government has certain rights in this invention.

Field: This invention relates in general to ultra low thermal expansion materials that exhibit very high thermal shock resistance. These materials can be used for a variety of low temperature as well as high temperature applications, where a material is subjected to sudden temperature changes and is also expected to have dimensional stability. The examples of such applications include, catalytic substrates, optical devices such as ring laser gyro, exhaust port liners for internal combustion engines, etc.

BACKGROUND OF THE INVENTION

Almost every material has a substantial, positive coefficient of thermal expansion, i.e. it expands significantly when heated. Since World War II, the importance of low expansion ceramics has been realized and extensive research has been conducted to develop materials that exhibit low thermal expansion. Some of the well know materials include vitreous silica, lithium alumino-silicates ($LiAlSiO_4$, $LiAlSi_2O_6$), and cordierite ($Mg_2Al_4Si_5O_{18}$). Vitreous silica is used in a variety of low temperature applications such as various optical systems. Lithium alumino-silicates (LAS) are used as a major constituent of cooking ware; and cordierite as the main component of catalytic substrate bodies. However most of these materials have temperature limitations, i.e. they cannot be used at very high temperatures.

Components of catalytic converters used in automobiles as well as industrial emission control systems are subjected to very large temperature variations. These components are therefore made out of low thermal expansion and highly thermal shock resistant ceramic materials. Current state of the art materials include aluminum titanate, and cordierite. However, aluminum titanate possesses a structural instability (decomposition into rutile and corundum) below 1300° Centigrade (C), destroying the pseudobrookite structure and resulting in a loss of low thermal expansion behavior. Cordierite, due to its relatively low melting temperature, cannot be used above 1200° C.

Some of the components of earth orbiting satellites are also subject to temperature fluctuations. If these components are made out of materials having a large thermal expansion, then sudden temperature changes can cause the component to distort or fracture under thermal stresses. This problem is of a great concern in optical systems used in space that cannot function satisfactorily under frequently changing dimensions of the component.

Ceramics of the type $Na_{1+x}Zr_2P_{3-x}Si_xO_{12}$ (also known as NASICON) and $NaZr_2P_3O_{12}$ (or NZP) have been studied for their ionic conductivity. Sljukic, et al. were the first to synthesize NZP-type materials ("Preparation and Crystallographic Data of Phosphates with Common Formula $M^IM^{IV}(PO_4)_3$; $M^I$=Li, Na, K, Rb, Cs; $M^{IV}$=Zr, Hf; Croatia Chemica Acta, 39, pp. 145–148, 1967) by heating a mixture of alkali metal phosphates and tetravalent metal oxides. The crystal structure of NZP type materials consists of a three-dimensional hexagonal skeleton network of $PO_4$ tetrahedra connected with $ZrO_6$ octahedra by corner linking. Each $PO_4$ tetrahedron is connected to four $ZrO_6$ octahedra and each $ZrO_6$ octahedron is connected with six $PO_4$ tetrahedra. The basic unit of the network consists of two octahedra and three tetrahedra corresponding to ($Zr_2P_3O_{12}$). These units in turn are so connected as to form ribbons along the c-axis, that are joined together (perpendicular to the c-axis) by $PO_4$ tetrahedra to develop a three dimensional rigid network. The articulation of these ribbons and chains is believed to create structural holes or interstitial vacant sites in the structure which are normally occupied by sodium and/or other substituting ions. There are four such interstitial sites per formula unit of which some are empty depending upon the particular substitution.

The most important and extraordinary feature of the NZP structure is its exceptional flexibility towards ionic substitution at various sites. This feature is extremely important for manipulating the thermal expansion behavior of NZP type materials. J. P. Boilot and J. P. Salantie, as reported in "Phase Transformation in $Na_{1+x}Zr_2P_{3-x}Si_xO_{12}$ Compounds", Materials Research Bulletin Vol. 14, pp.1469–1477, 1979, found that the thermal expansion of various compositions in $Na_{1+x}Zr_2P_{3-x}Si_xO_{12}$ varied from strongly positive to near zero to even negative values. Based on these results J. Almo and R. Roy further investigated the NZP type materials and showed that NZP type materials indeed show low thermal expansion and have extraordinary flexibility towards ionic substitutions ("Ultralow Expansion Ceramics in the System $Na_2O$—$ZrO_2$—$P_2O_5$—$SiO_2$, "Journal of American Ceramic Society, Vol 67 No.5 pp. C-78–C-79 1984; "Crystal Chemistry of the $NaZr_2(PO_4)_3$, NZP or CTP Structure Family," Journal of Materials Science, vol. 21 pp.444–450 1986).

Later investigations on NZP type materials were performed by D. K. Agrawal and V. S. Stubican ("Synthesis and Sintering of $Ca_{0.5}Zr_2P_3O_{12}$—A Low Thermal Expansion Material," Materials Research Bulletin, vol. 20 No 2 pp. 99–106, 1985) reporting the sintering characteristics of $CaZr_4(PO_4)_6$. T. Oota and I. Yamai in a publication entitled "Thermal Expansion Behavior of $NaZr_2(PO_4)_3$—Type Compounds," Journal of the American Ceramic Society, vol 69 No.1 pp. 1–6 (1986) suggested that if larger ions such as $K^+$ or $Sr^{2+}$ are substituted at the sodium site, then the c-axis will be stretched. The $PO_4$ tetrahedra that cross link the chains along the c-axis are strained upon stretching of the c-axis. Hence, during heating, further expansion along the c-axis is suppressed, and the expansion along the a-axis is enhanced. They also concluded that in NZP type materials, the skeletal framework thermal expansion is almost zero, and that the total expansion was mainly determined by the ionic substitution at different crystallographic sites.

Recently S. Y. Limaye, D. K. Agrawal and H. A. McKinstry ("Synthesis and Thermal Expansion of $MZr_4P_6O_{24}$ (M=Mg, Ca, Sr, Ba)," Journal of the American Ceramic Society Vol. 70 No. 10 pp. C-232–C-236 1987) conducted a systematic survey of NZP type materials with alkaline earth ions substituted at the sodium site. They found that $MgZr_4P_6O_{24}$ did not result in a structure similar to NZP, that $CaZr_4P_6O_{24}$ had positive thermal expansion along the c-axis and negative thermal expansion along a-axis, and that $SrZr_4P_6O_{24}$ and $BaZr_4P_6O_{24}$ showed exactly opposite thermal expansion anisotropy This work was further extended by making a solid solution of $CaZr_4P_6O_{24}$ and $SrZr_4P_6O_{24}$ which showed reduced thermal expansion anisotropy and also reduced bulk thermal expansion. However, most of the earlier research has been concentrated on making ionic substitutions at sodium and zirconium sites. Earlier research did not address the following issues: the thermal expansion anisotropy (except for the solid solution of $CaZr_4P_6O_{24}$ and $SrZr_4P_6O_{24}$), effect of the thermal expansion anisotropy on various properties (including Young's modulus, strength etc.) characterization of the thermal expansion up to higher (e.g. 1200° C.) temperatures, evaluation of cyclic thermal expansion, strength and thermal shock resistance, efforts to improve the strength and thermal shock resistance and non-linear thermal expansion, i.e. large variation in thermal expansion with respect to temperature. Furthermore, most of these materials have relatively higher thermal expansion than fused quartz up to 500° C.

SUMMARY OF THE INVENTION

The invention includes a new ceramic compositions which exhibit very low bulk thermal expansion (less than fused quartz) and which have superior strength and thermal shock resistance. Silicon is partially substituted for phosphorous in and the deficient charge is compensated for by adding excess cations at the sodium site or partially substituting yttrium for zirconium and compensating the deficient charge by adding excess cations at sodium site instead of just substituting larger cations at the sodium site. Similar results are achieved by simultaneously substituting the yttrium and silicon for both the zirconium and the phosphorous sites respectively and compensating the deficient charge by adding excess cations at sodium site. The chemical formulae for such ceramic compositions can be written as:

$\phi_{1+x}Zr_4P_{6-2x}Si_{2x}O_{24}$ wherein $\phi$ is either Sr (strontium) or Ba (barium) and X has values ranging from about 0.3 to 0.8. Hafnium may be partially or fully substituted for zirconium.

$\phi_{1+x}Zr_{4-2x}Y_{2x}P_6O_{24}$ wherein $\phi$ is either Sr (strontium) or Ba (barium) and X has values ranging from about 0.2 to 0.6. Hafnium may be partially or fully substituted for zirconium.

$\phi_{1+x}Zr_{4-x}Y_xP_{6-x}Si_xO_{24}$ wherein $\phi$ is either Sr (strontium) or Ba (barium) and X has values ranging from about 0.3 to 0.7. Hafnium may be partially or fully substituted for zirconium.

The present invention is to provide novel structural ceramic components having extremely high dimensional stability, high strength and high thermal shock resistance over a wide range of temperature which can be used for a variety of applications including, but not limited to, catalytic convertors, emission control devices, space optics, exhaust port liners for diesel engines and similar applications.

The present invention further provides an improved process for producing materials that have ultra low thermal expansion and high strength as well as high thermal shock resistance.

Ceramic materials of the instant invention have improved characteristics compared to many of the current state of the art low thermal expansion materials. Even in comparison with the currently known NZP type materials and their known properties, these new compositions demonstrate superior thermal expansion, thermal shock resistance, and mechanical properties and hence are useful over a wide range of temperatures and stress conditions.

DETAILED DESCRIPTION OF PREFERRED EMBODIMENTS

Novel NZP-type structural ceramic compositions having extremely high dimensional stability, high strength and high thermal shock resistance over a wide range of temperatures have been invented. The low thermal expansion ceramic compositions of this invention generally belong to three different series of compositions which show varying thermal expansion from positive to near zero to negative thermal expansion. The chemical formula for the compositional series can be written as $\phi_{1+x}Zr_4P_{6-2x}Si_{2x}O_{24}$, $\phi_{1+x}Zr_{4-2x}Y_{2x}P_6O_{24}$ and $\phi_{1+x}Zr_{4-x}Y_xP_{6-x}Si_xO_{24}$ where "$\phi$" represents Sr (strontium) and/or Ba (barium) and "X" represents the atomic proportions of the constituent elements.

FIGS. 1, 2, 3 and 4 show fractional length change () vs. temperature curves for various values of "X" in the compositional series $Sr_{1+x}Zr_4P_{6-2x}Si_{2x}O_{24}$, $Ba_{1+x}Zr_4P_{6-2x}Si_{2x}O_{24}$, $Sr_{1+x}Zr_{4-2x}Y_2P_6O_{24}$ and $Sr_{1+x}Zr_{4-x}Y_xP_{6-x}Si_xO_{24}$ respectively. When the value of "X" is 0.6, for the composition $Sr_{1+x}Zr_4P_{6-2x}Si_{2x}O_{24}$, the resulting ceramic has ultra low thermal expansion. The chemical formula for this specific composition can be written as $Sr_{1.6}Zr_4P_{4.8}Si_{1.2}O_{24}$. When the value of "X" is 0.5 for the series $Ba_{1+x}Zr_4P_{6-2x}Si_{2x}O_{24}$, the resulting ceramic has ultra-low thermal expansion. The chemical formula for this specific composition can be written as $Ba_{1.5}Zr_4P_5SiO_{24}$. When the value of "X" is 0.4, for the composition $Sr_{1+x}Zr_{4-2x}Y_{2x}P_6O_{24}$, the resulting ceramic has ultra-low thermal expansion. The chemical formula for this specific composition can be written as $Sr_{1.4}Zr_{3.2}Y_{0.8}P_6O_{24}$. When the value of "X" is 0.5, for the composition $Sr_{1+x}Zr_{4-x}Y_xP_{6-x}Si_{2x}O_{24}$, the resulting ceramic has ultra-low thermal expansion. The chemical formula for this specific composition can be written as $Sr_{1.5}Zr_{3.5}Y_{0.5}P_{5.5}Si_{0.5}O_{24}$.

In the formula $Sr_{1+x}Zr_4P_{6-2x}Si_{2x}O_{24}$ the value of X generally ranges from about 0.4 to about 0.8 but is more typically between about 0.5 and about 0.7 and preferably is about 0.6 0.05. The coefficient of thermal expansion for ceramics wherein X is from 0.5 to 0.7 is very good (in the range of $\pm 2 \times 10^{-6}$) while the coefficient of thermal expansion of ceramics wherein X is approximately 0.6 is excellent, being essentially zero ($\pm 5 \times 10^{-7}$).

In the formula $Ba_{1+x}Zr_4P_{6-2x}Si_{2x}O_{24}$ the value of X generally ranges from about 0.3 to about 0.7 but is more typically between about 0.4 and about 0.6 and preferably is about 0.5$\pm$0.05. The coefficient of thermal expansion for such ceramics wherein X is from 0.4 to 0.6 is very good (in the range of ±2.2×10⁻⁶) while the coefficient of thermal expansion of such ceramics wherein X is approximately 0.5 is excellent, being essentially zero (±5×10⁻⁷).

In the formula $Sr_{1+x}Zr_{4-2x}Y_{2x}P_6O_{24}$ the value of X generally ranges from about 0.2 to about 0.6 but is more typically between about 0.3 and about 0.5 and preferably is about 0.4±0.05. The coefficient of thermal expansion for such ceramics wherein X is from 0.2 to 0.6 is very good (in the range of ±2.2×10⁻⁶) while the coefficient of thermal expansion of such ceramics wherein X is approximately 0.5 is excellent, being essentially zero (±5×10⁻⁷).

In the formula $Sr_{1+x}Zr_{4-x}Y_xP_{6-x}Si_xO_{24}$ the value of X generally ranges from about 0.3 to about 0.7 but is more typically between about 0.4 and about 0.6 and preferably is about 0.5±0.05. The coefficient of thermal expansion for such ceramics wherein X is from 0.4 to 0.6 is very good (in the range of ±2.2×10⁻⁶) while the coefficient of thermal expansion of such ceramics wherein X is approximately 0.5 is excellent, being essentially zero (±5×10⁻⁷).

Figure 1:
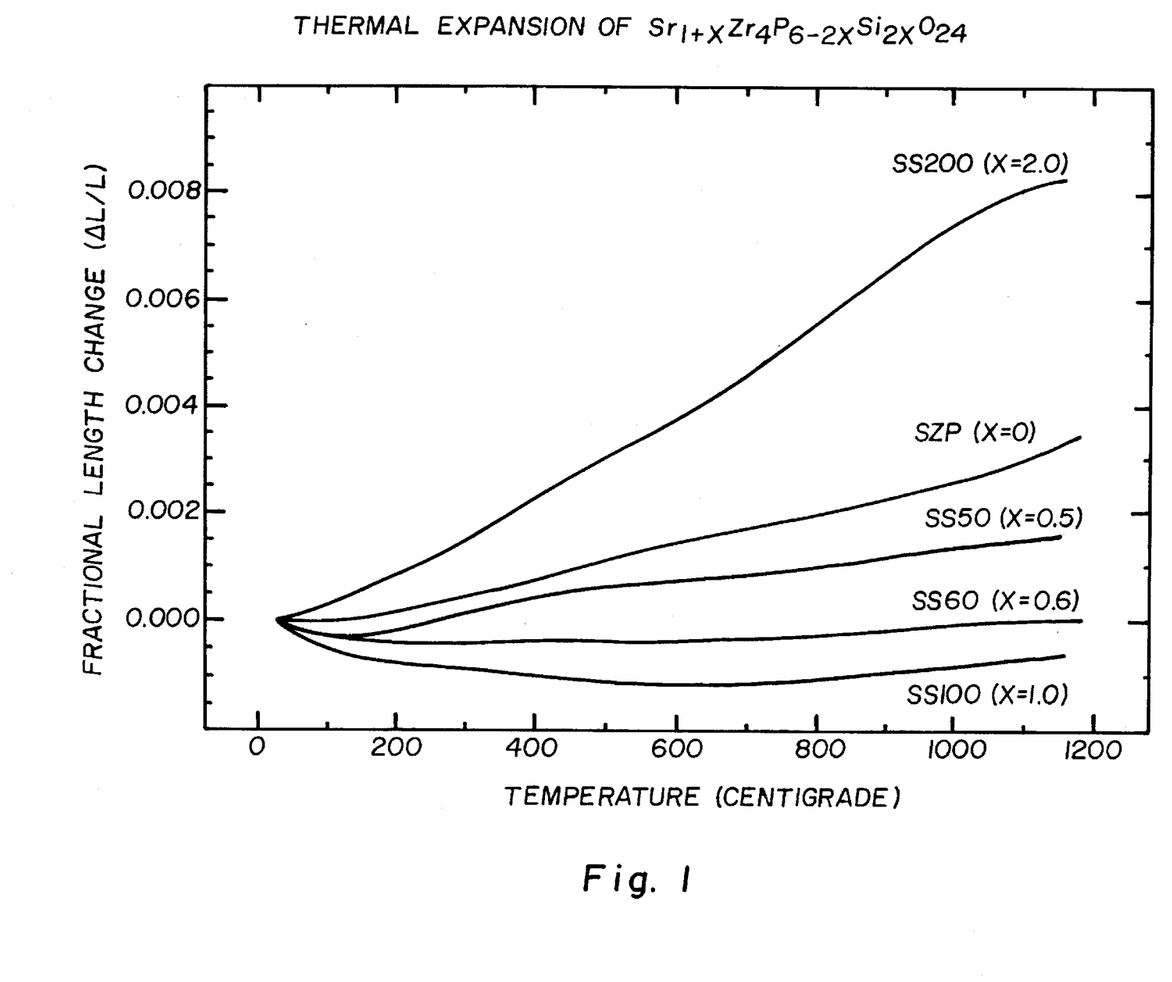
FIG. 1 is graph illustrating the variation in thermal expansion over a wide range of temperatures for ceramic compositions of the formula $Sr_{1+x}Zr_4P_{6-2x}Si_{2x}O_{24}$.

In the novel compositions of this invention, hafnium may be substituted for a part or all of the zirconium present. In addition, Sr and Ba ions can be partially or fully substituted for each other. Thus, the formulas may be written as $Sr_{(1+x)-y}Ba_yZr_{4-z}Hf_zP_{6-2x}Si_{2x}O_{24}$ and $Ba_{(1+x)-y}Sr_yZr_{4-z}Hf_zP_{6-2x}Si_{2x}O_{24}$ wherein X has the values stated herein above, Y can vary from 0.00 to 1.80 (or 1+X) and z can vary from 0.00 to 4.00. The compositions in FIG. 1 represent the formula $Sr_{(1+x)-y}Ba_yZr_{4-z}Hf_zP_{6-2x}Si_{2x}O_{24}$ wherein Y and z have zero value for all the compositions and X has the following values: SZP—zero; SS50—0.5; SS60—0.6; SS100—1.0; and SS200—2.0.

Figure 2:
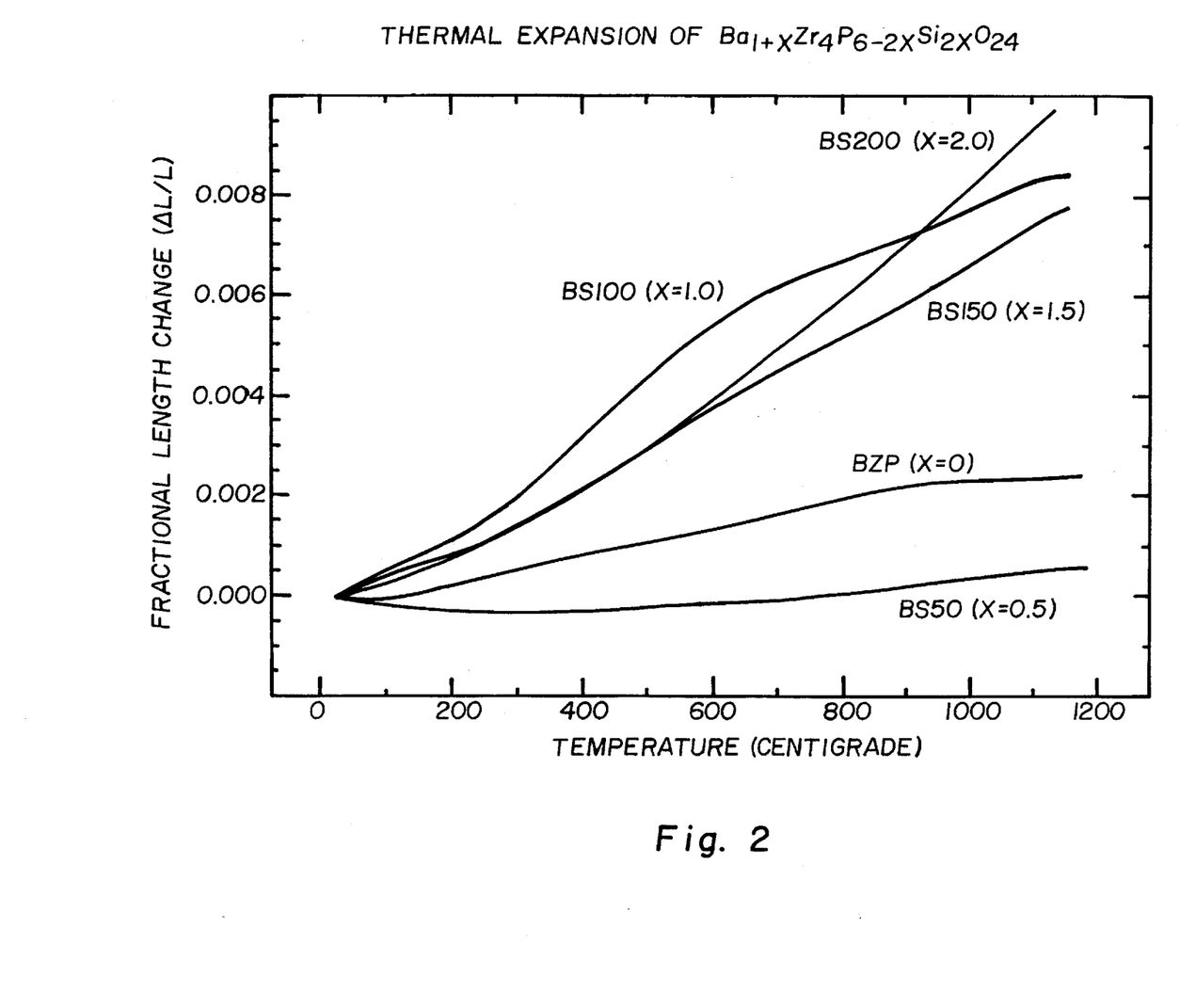
FIG. 2 is graph illustrating the variation in thermal expansion over a wide range of temperatures for ceramic compositions of the formula $Ba_{1+x}Zr_4P_{6-2x}Si_{2x}O_{24}$.
Figure 3:
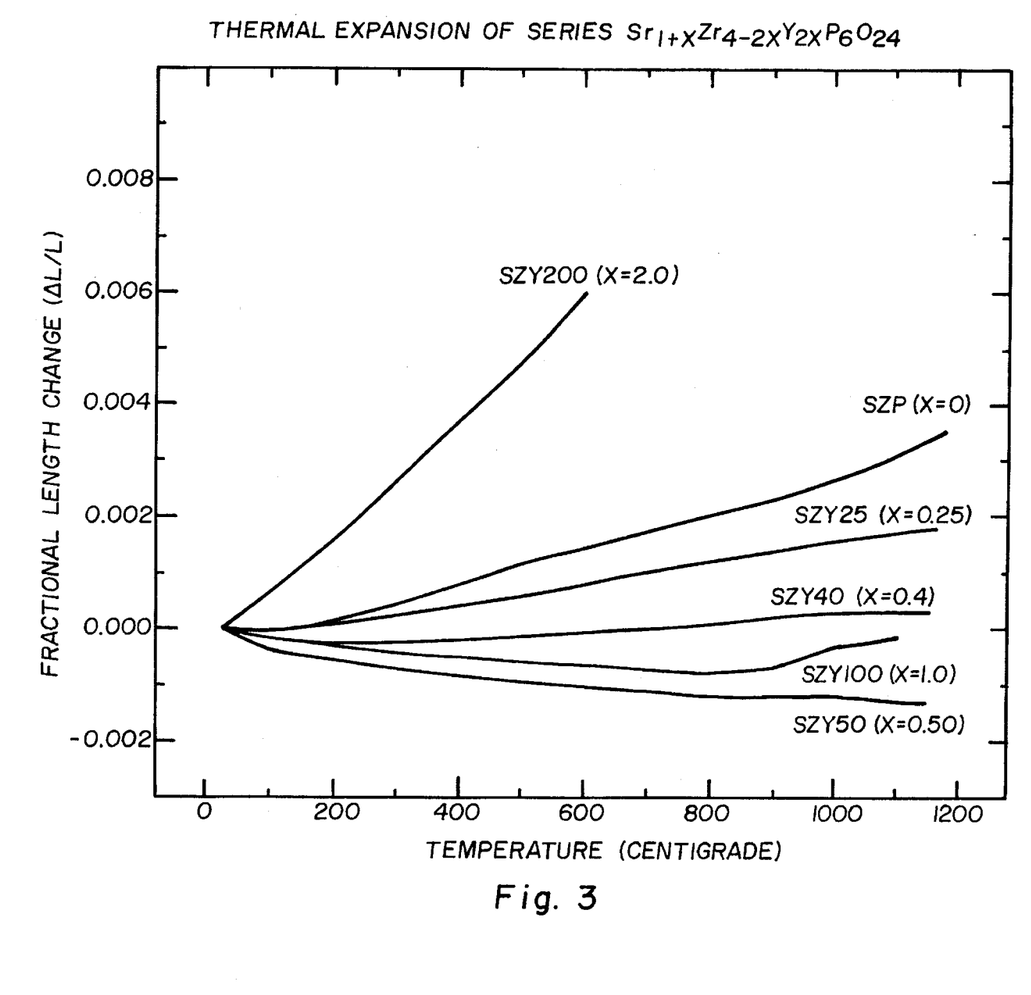
FIG. 3 is graph illustrating the variation in thermal expansion over a wide range of temperatures for ceramic compositions of the formula $Sr_{1+x}Zr_{4-2x}Y_{2x}P_6O_{24}$.
Figure 4:
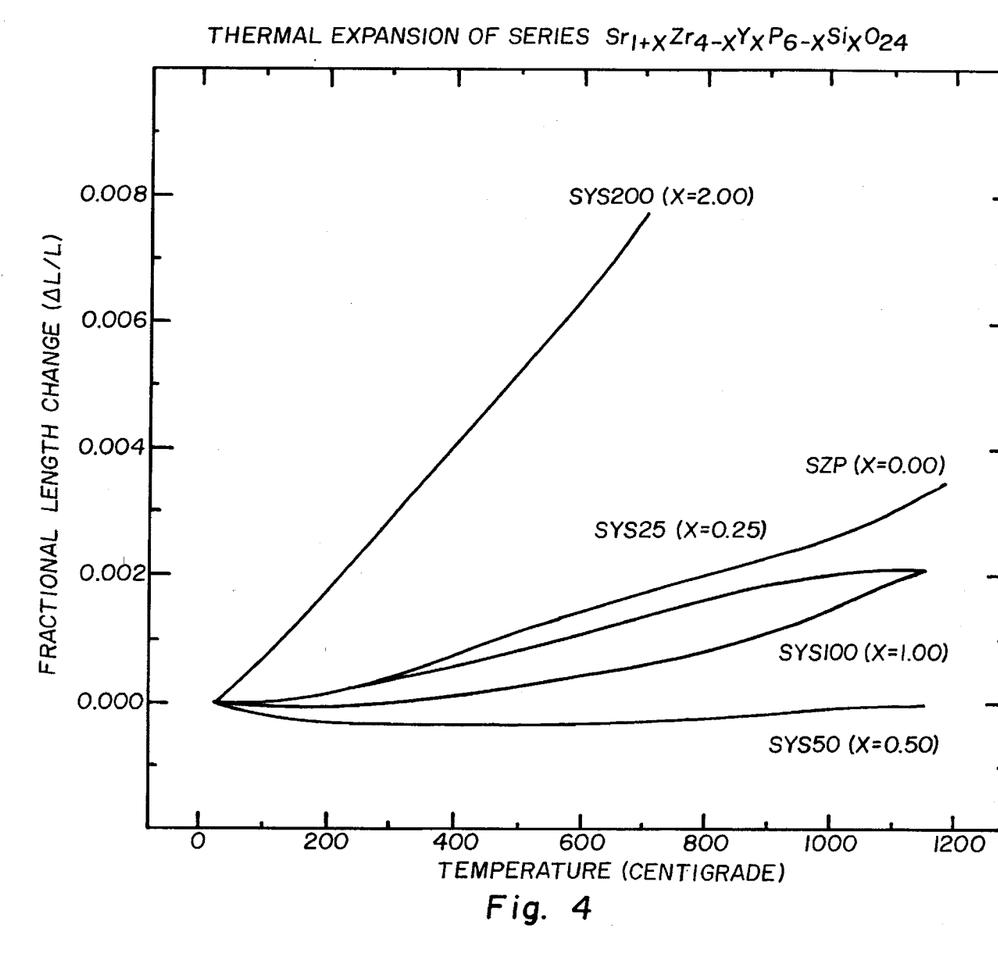
FIG. 4 is graph illustrating the variation in thermal expansion over a wide range of temperatures for ceramic compositions of the formula $Sr_{1+x}Zr_{4-x}Y_xP_{6-x}Si_xO_{24}$.

The compositions in FIG. 2, represent the formula $Ba_{(1+x)-r}Sr_yZr_{4-z}Hf_zP_{6-2x}Si_{2x}O_{24}$ wherein Y and Z have zero value for all the compositions and X has the following values: BZP—zero; BS50—0.5; BS100—1.0; BS150—1.5 and BS200—2.0.

The structure is preferably substantially single phase in order to achieve the desired low thermal expansion properties. Very small amounts (nearly 5% (volume)) of second phase materials such as zircon ($ZrSiO_4$) can be, however, tolerated.

In the case of $Ba_{1.5}Zr_4P_5SiO_{24}$, larger amounts (greater than 5% (volume)) of a second phase may be present which can have some impact on the coefficient of thermal expansion. Preferably, the starting raw materials used to synthesize this composition should be chemically pure. However, minor amounts of impurities that do not cause a significantly large amount, i.e. greater than 5% by volume, of any second phase to occur can be tolerated.

The ceramic compositions of the present invention may be formed in any known or desired manner used for forming structural ceramics. Various known synthesis techniques such as sol-gel, solid state reaction (or oxide mixing) method, hydrothermal and like techniques can be used to synthesize the composition.

The raw materials for sol-gel technique include water soluble salt of zirconium (e.g. zirconium oxychloride, $ZrOCl_2 \cdot X\ H_2O$), strontium nitrate ($Sr(NO_3)_2 \cdot X \cdot H_2O$), yttrium nitrate ($Y(NO_3)_3 \cdot X \cdot H_2O$) ammonium dihydrogen phosphate or phosphoric acid and ludox or other types of silica sols. In utilizing the oxide mixing technique, various different precursors can be used. To give an example, a stoichiometric mixture of strontium zirconate ($SrZrO_3$), zirconium pyrophosphate ($ZrP_2O_7$) and silica ($SiO_2$) can be calcined to give single phase $Sr_{1.6}Zr_4P_{4.8}Si_{1.2}O_{24}$. In the hydrothermal technique, a technique similar to that used for sol-gel can be used to produce precursor powder which then can be treated hydrothermally under controlled pH to obtain single phase $Sr_{1.6}Zr_4P_{4.8}Si_{1.2}O_{24}$.

In oxide mixing or solid state reaction process, proper raw materials could be added in the stoichiometric proportions and ground to produce fine homogeneous mixture of raw materials. While any suitable grinding method may be used, ball milling is preferred for convenience and reliability. This mixture then can be calcined at 1200° C. for 16 hours and then reground and heated to 1400° C. for 12 to 16 hours to obtain the single phase composition.

In another method of synthesis (sol-gel technique), one may mix the aqueous solutions containing $Sr^{+2}$ and $Zr^{+4}$ ions and add silica sol to it followed by addition of solution containing phosphorous ions. Such a mixture yields a precipitate that can be dispersed to form a sol which after heating goes through a transition to gel state. Further heating causes the gel to dry and form fine agglomerated powder. This powder can be ground using any suitable grinding method and can be calcined at 700° C. for 16 hours to form single phase $Sr_{1.6}Zr_4P_{4.8}Si_{1.2}O_{24}$.

Any known forming technique such as pressureless sintering, hot pressing, slip casting, extrusion, injection molding and the like can be used. In case of pressureless sintering technique, powder obtained from one of the synthesis techniques mentioned above can be ground to break the agglomerates to obtain uniform particle size distribution. Organic binder, such as polyvinyl buterol (PVB) or polyvinyl alcohol (PVA) can be added up to 1 to 2 weight percent to improve the green strength of the component. The material is then formed into a desired shape. Typically, the material may be formed in an uniaxial hydraulic press at about 100 to 200 MPa, followed by isostatic pressing at 250 MPa. After the isostatic pressing the component is heated slowly in a furnace up to the binder burnout temperature. The component is then further heated up to the sintering temperature of 1400° to 1500° C. for 12 hours.

The density of the component is measured by standard Archimedes technique. The sintered component is weighed and then immersed in a liquid of known density and displaced volume of the liquid is measured. The density is obtained by dividing the weight of the component by the volume of the displaced liquid.

To ensure single phase formation, the component is characterized by using the standard powder X-ray diffraction technique. The X-ray pattern obtained is then evaluated to obtain lattice parameters of the crystalline phase present. These lattice parameters are used to determine the theoretical density of the material.

The microstructure of the component is observed under a scanning electron microscope to determine the grain size distribution and other features such as grain morphology, porosity etc.

Coefficient of thermal expansion is measured by standard push rod dilatometer. The sample is heated in a furnace and the change length is measured as a function of temperature.

Thermal expansion anisotropy or coefficient of thermal expansion is measured by high temperature X-ray diffraction technique.

Strength of the component is measured by using the standard four point bend test. The typical strength of such material varies depending upon the synthesis and fabrication technique used.

The thermal shock resistance is measured by the standard Hasselman test. During this test, the sample is heated to the predetermined temperature and then dropped into a bath of water at 0° C. The sample is then characterized for the strength. The quench temperature at which the strength drops by 50% is considered as the thermal shock temperature.

The compositions of the ceramic materials described herein are suitable for applications over a broad range of temperatures where advantage can be taken of low thermal expansion and high thermal shock properties. These applications may include catalytic convertor substrates, cooking ware, optical mirror substrates, various ceramic engine parts such as exhaust manifold components and similar applications.

Another advantage of these low thermal expansion compositions includes effective fabrication of whisker and/or fiber and/or particulate reinforced composites. The lower thermal expansion of the matrix material (compared to the whiskers and/or fibers and/or particulates) results in low interfacial stresses between the matrix and the reinforcing whisker and/or fibers and/or particulates. The reduced interfacial stress condition makes such composites less susceptible to catastrophic failures.

EXAMPLE 1

A 50 gram sample of the composition $Sr_{1.5}Zr_4P_5SiO_{24}$ was prepared by the sol-gel synthesis technique. The raw materials (strontium nitrate, zirconyl oxychloride, and ammonium dihydrogen phosphate) were dissolved in deionized solution. The silica sol (Ludox™ from DuPont) was predispersed solution. The quantitative analysis (using atomic absorption spectroscopy and/or loss on ignition techniques) was performed to establish the quantity of required ions per liter of the solution. Typically 0.5 to 0.25 molar solutions of strontium nitrate, zirconyl oxychloride and ammonium dihydrogen phosphate were prepared. First, the solutions containing $Sr^{+2}$ ions and $Zr^{+4}$ ions were mixed together in stoichiometric proportions under constant stirring conditions using a magnetic stirrer to obtain a homogeneous solution. Stoichiometric proportion of the silica sol was added to this mixture of solution containing $Sr^{+2}$ and $Zr^{+4}$ ions. This mixture was allowed to stir for at least 15 minutes to attain homogeneity. The solution containing phosphorous ions was added very slowly (drop by drop) to the mixture under vigorous stirring conditions. At this point the chemical reaction resulted in a fine precipitate which, after prolonged vigorous stirring, transformed in a highly homogeneous sol that contained the well dispersed precipitate. This sol, when heated at 90° C. for 16 hours, transformed into a translucent gel, which, upon further heating, yielded ultra-fine ceramic precursor powder. This dried gel was attrited to break the agglomerates and was then calcined in an alumina crucible at 700° C. for 16 hours. The calcined powder was then wet ball milled for 24 hours using alcohol as carrier. Zirconia grinding media was used to perform the grinding. Two weight percent XUS, an experimental binder from Dow chemical industry, and one weight percent PEG (polyethylene glycol) lubricant were also added to the ball milling batch. Other binders and lubricants, such as those previously recited, could also be effectively utilized instead of the XUS binder and PEG lubricant. After the ball milling was complete, the powder was dried and the soft agglomerates were broken down by light grinding. The powder was then screened through an 80 mesh sieve. The component was fabricated in a bar shape by uniaxially compressing the powder at 15 MPa followed by isostatic pressing at 250 MPa. The bar was then sintered using a heating cycle which allowed binder burnout at 500° C. for 4 hours. Sintering was performed at 1475° C. for 12 hours and then the samples were allowed to cool in the furnace.

The thermal expansion up to 1200° C. was measured on a 5 cm. long bar by using a standard push rod dilatometer from Harrop industries with pure alumina as reference standard. At least three measurements were made to obtain average thermal expansion.

The strength was measured by four point bend test on 10 bars, which showed an average strength of approximately 115 MPa.

Figure 5:
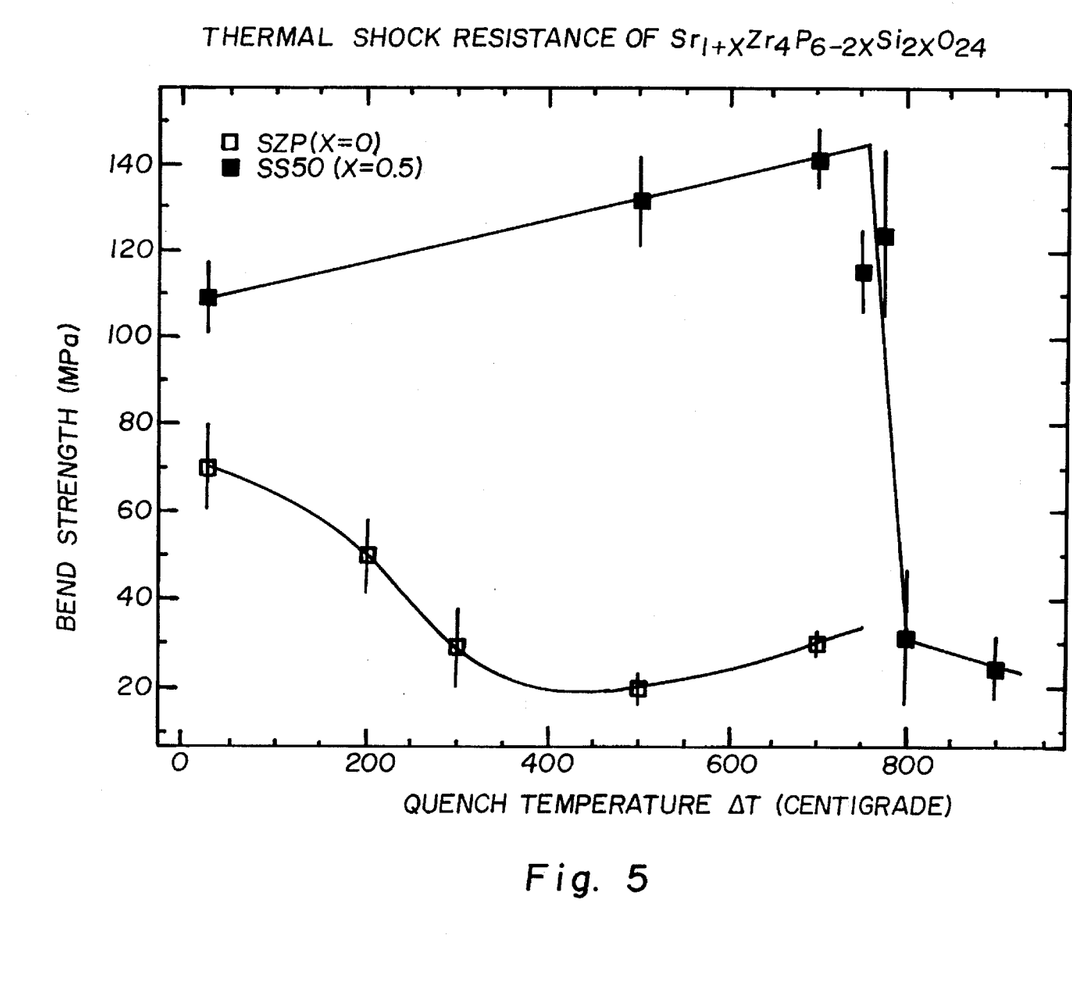
FIG. 5 is a graph illustrating the variation in thermal shock resistance for two compositions within the formula $Sr_{1+x}Zr_4P_{6-2x}Si_{2x}O_{24}$ for a range of quench temperatures differentials.

A typical thermal shock resistance data is shown in FIG. 5 indicating discontinuous drop in strength at the thermal shock temperature. For the composition $Sr_{1.5}Zr_4P_5SiO_{24}$ the temperature at which the strength drops discontinuously was 775° C.

Various compositions of the formula $Sr_{1+x}Zr_4P_{6-2x}O_{24}$ were prepared according to the technique detailed in this Example 1 in which the composition was one in which X=0.5. The other compositions prepared were ones in which X was zero, 0.6, 1.0 and 2.0 as well as 0.5. These compositions were formed into ceramic bars in the manner set forth in this Example 1 and the thermal expansion was measured. The results of these measurements are set forth in FIG. 1. Generally compositions in which the value of X was equal to or greater confirmed significant volumes of a second phase i.e. a second phase present in volumes greater than 5%.

Various compositions of the formula $Ba_{1+x}Zr_4P_{6-2x}O_{24}$ were prepared according to the technique detailed in Example 1 by the substitution of barium compound for strontium compound used in Example 1. The compositions prepared were ones in which X was zero, 0.5, 1.0, 1.5 and 2.0. These compositions were formed into ceramic bars in the manner set forth in Example 1 and the thermal expansion was measured. The results of these measurements are set forth in FIG. 2.

EXAMPLE 2

Various compositions in the series $Sr_{1+x}Zr_4P_{6-2x}Si_{2x}O_{24}$ and $Ba_{1+x}Zr_4P_{6-2x}Si_{2x}O_{24}$, were prepared by solid state reaction technique. The stoichiometric proportions of the raw materials ($BaZrO_3$ or $SrZrO_3$, $ZrP_2O_7$ and $SiO_2$) were homogeneously mixed by wet ball milling (alcohol as a carrier liquid) the raw materials. The slurry obtained following the ball milling was dried to yield dried powder which was calcined at 1200° C. for 24 hours. The crystalline phases present in the calcined powder were evaluated by routine powder X-ray diffraction technique. In most of the compositions, large amounts of [NZP] type materials were formed; however, in some cases, $ZrP_2O_7$ was not fully reacted. In the case of $Sr_{1+x}Zr_4P_{6-2x}Si_{2x}O_{24}$ series of compositions, it was found that when the value of "X" exceeded 0.8, significant amount of unknown second phase (or phases) were formed. In the case of $Ba_{1+x}Zr_4P_{6-2x}Si_{2x}O_{24}$ series of compositions, it was found that when the value of "X" exceeded 0.7, significant amount of unknown second phase (or phases) were formed. The calcined powder was then wet ball milled for 24 hours using alcohol as carrier. Zirconia grinding media was used to perform the grinding. Two weight percent XUS, an experimental binder from Dow chemical industry, and one weight percent PEG (polyethylene glycol) lubricant were also added to the ball milling batch. Other binders and lubricants, such as those previously recited, could also be effectively utilized instead of the XUS binder and PEG lubricant. After the ball milling was complete, the powder was dried and the soft agglomerates were broken down by light grinding. The powder was then screened through an 80 mesh sieve. The component was fabricated in a bar shape by uniaxially compressing the powder at 15 MPa followed by isostatic pressing at 250 MPa. The bar was then sintered using a heating cycle which allowed binder burnout at 500° C. for 4 hours. Sintering was performed at 1500° C. for 12 hours and then the samples were allowed to cool in the furnace.

The thermal expansion anisotropy of these compositions was measured by high temperature X-ray diffraction. The lattice parameters as function of temperature were measured and the thermal expansion of along the crystallographic axes were determined.

Figure 6:
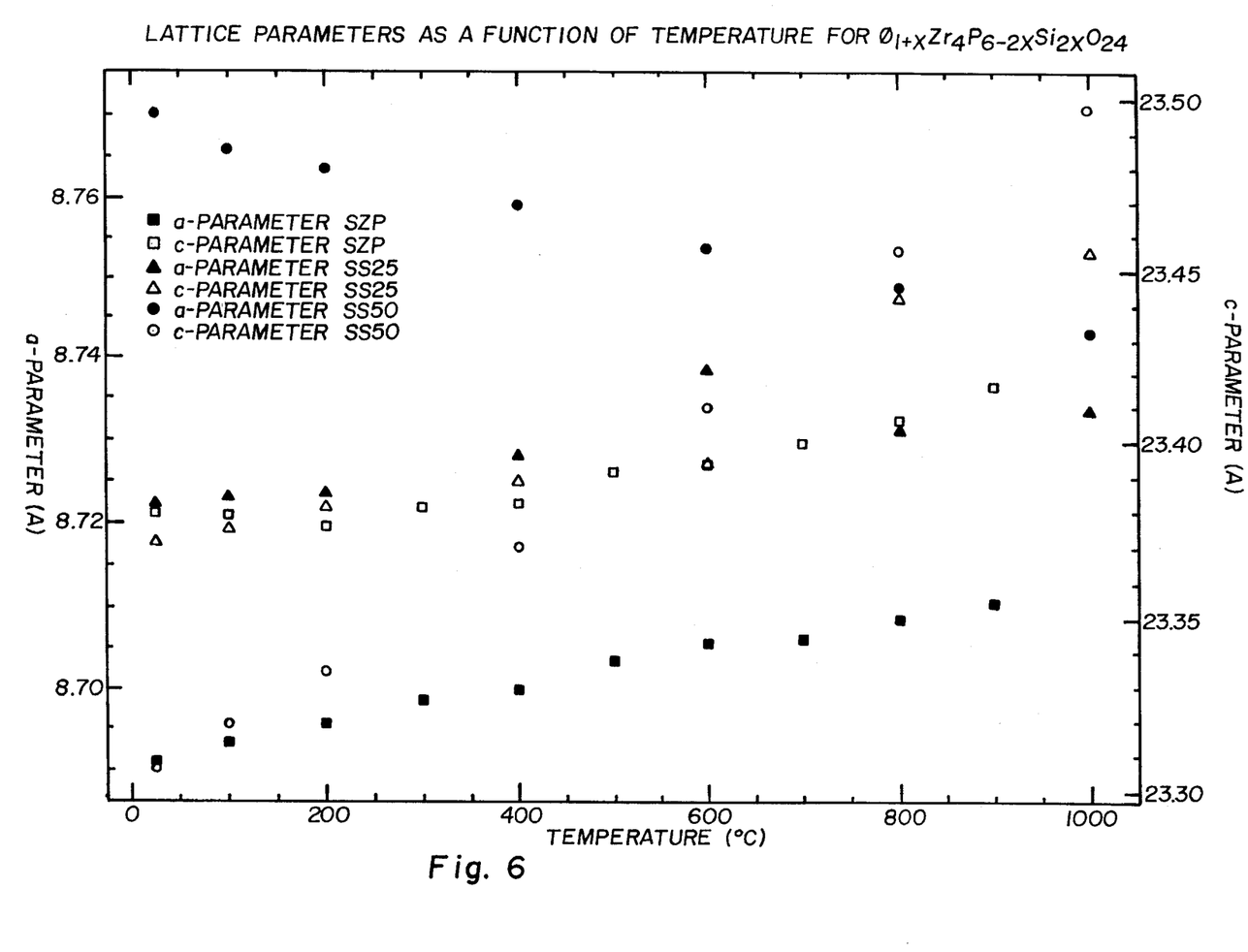
FIG. 6 is a graph illustrating the axial thermal expansion for various compositions in the series $Sr_{1+x}Zr_4P_{6-2x}Si_{2x}O_{24}$.
Figure 7:
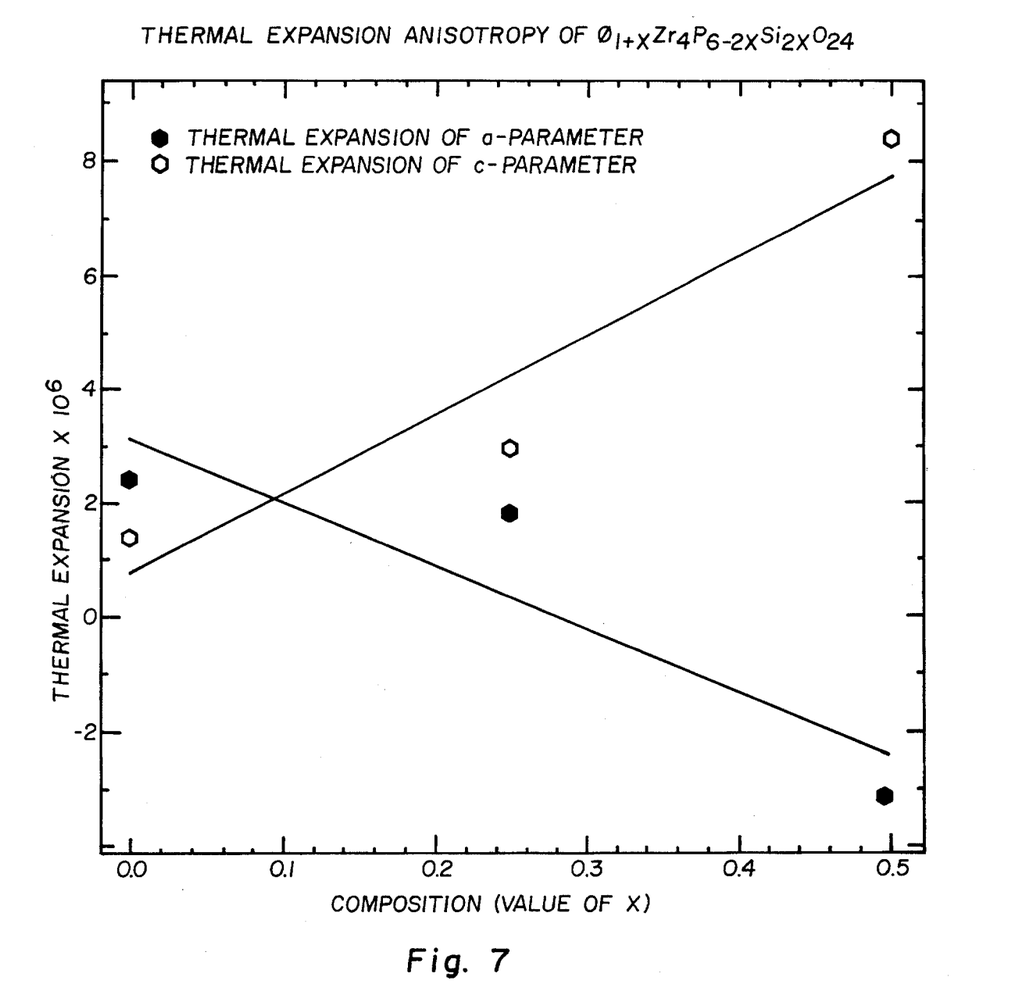
FIG. 7 is a graph illustrating the thermal expansion anisotropy resulting from varying azial thermal expansion for various compositions in the series $Sr_{1+x}Zr_4P_{6-2x}Si_{2x}O_{24}$.

FIG. 6 shows the axial thermal expansion for $Sr_{1+x}Zr_4P_{6-2x}Si_{2x}O_{24}$ series of compositions. FIG. 7 shows the thermal expansion along both the axes for the same compositions. It can been seen from the FIG. 7 that the thermal expansion anisotropy will be minimum at approximately X=0.13. Such composition has minimum amount of microcracking, hence high Young's modulus, and high strength. However, the thermal expansion, as can be seen from FIG. 1, will not be at its minimum.

This example shows that the thermal expansion and the thermal expansion anisotropy are independent parameters of these materials that can be manipulated by changing the chemical composition of the material to yield optimum properties for the desired application.

For some uses it may be desirable to toughen the ceramic by the inclusion of zirconia or hafnia powders with the low expansion ceramic powders. These zirconia or hafnia powders when stabilized with yttria, ceria, or other stabilizers will remain in tetragonal crystal form after sintering to provide a toughened low expansion ceramic. These crystals may be present up to 30% by volume of the ceramic component.

These ceramics may also be strengthened by inclusion of fibers or whiskers of silicon carbide, alumina, mullite, carbon, glass and the like.

Exhaust port liners formed from the ceramic prepared in Example 1 exhibit excellent properties.

A catalytic converter substrate formed from the ceramic prepared in Example 1 exhibits excellent properties.

While not intending to be bound by one theory of the invention, the following theory may help to explain the phenomena observed in the present invention. The compositions of the present invention are believed to take advantage of crystal structure which supports flexibility towards ionic substitution and strain the c-axis by adding excess ions at the sodium site. This may be achieved by partially substituting silicon for phosphorous and compensating the deficient charge by adding excess cations at the sodium site or partially substituting yttrium for zirconium and compensating the deficient charge by adding excess cations at sodium site instead of just substituting larger cations at the sodium site. Another way of achieving similar effects should be to simultaneously substitute the yttrium and silicon for both the zirconium and the phosphorous sites respectively and compensating the deficient charge by adding excess cations at sodium site.

Although the invention has been described with a certain degree of particularity in both composition and theory, it is to be understood that the present disclosure has been made only by way of example and that numerous changes in details of composition may be resorted to without departing from the scope of the following claims.

What is claimed:

1. A ceramic having substantially neutral bulk thermal expansion and anisotropy consisting essentially of a substantially single phase composition of $\phi_{1+x}\theta_4P_{6-2x}Si_{2x}O_{24}$ wherein X is a number having a value of between about 0.2 and 0.8, $\phi$ is either strontium, barium or mixtures thereof, and $\theta$ is either zirconium, hafnium, or mixtures thereof; said bulk material thermal expansion being over a temperature of from about 0° C. to about 1200° C.

2. The ceramic of claim 1 wherein $\phi$ is Sr and X is a number having a value from about 0.5 to about 0.7.

3. The ceramic of claim 2 wherein X is a number having a value of about 0.6±0.05.

4. The ceramic of claim 1 further including a separate phase of $ZrO_2$ and/or $HfO_2$ tetragonal crystals.

5. The ceramic of claim 1 wherein fibers or whiskers of other ceramic materials are present in said ceramic.

6. The ceramic of claim 1 wherein $\phi$ is Ba and X is a number having a value of between about 0.2 and 0.7.

7. The ceramic of claim 6 wherein X is a number having a value of about 0.5±0.05.

8. The ceramic of claim 6 further including a separate phase of $ZrO_2$ and/or $HfO_2$ tetragonal crystals in the ceramic present as a toughening agent.

9. The ceramic of claim 6 further including fibers or whiskers of other ceramic materials in the ceramic.

10. A ceramic having substantially neutral bulk thermal expansion anisotropy consisting essentially of a substantially single phase composition of $\phi_{1+x}\theta_{4-2x}Y_{2x}P_6O_{24}$ wherein X is a number having a value of between about 0.2 and 0.6, wherein $\phi$ is either strontium, barium or mixtures thereof, and $\theta$ is either hafnium or zirconium.

11. The ceramic of claim 10 wherein X is a number having a value from about 0.3 to about 0.5.

12. The ceramic of claim 11 wherein X is a number having a value of about 0.4±0.05.

13. The ceramic of claim 11 further including a separate phase of $ZrO_2$ and/or $HfO_2$ tetragonal crystals in the ceramic as a toughening agent.

14. The ceramic of claim 11 wherein fibers or whiskers of other ceramic materials are present.

15. A ceramic having substantially neutral bulk thermal expansion anisotropy consisting essentially of a substantially single phase composition of $\phi_{1+x}\theta_{4-x}Y_xP_{6-x}Si_xO_{24}$ wherein X is a number having a value of between about 0.3 and 0.7, wherein $\phi$ is either strontium, barium or mixtures thereof, and $\theta$ is either hafnium or zirconium.

16. The ceramic of claim 15 wherein X is a number having a value from about 0.4 to about 0.6.

17. The ceramic of claim 16 wherein X is a number having a value of about 0.5±0.05.

18. The ceramic of claim 16 further including a separate phase of $ZrO_2$ and/or $HfO_2$ tetragonal crystals to toughen the ceramic.

19. The ceramic of claim 16 wherein fibers or whiskers of other ceramic materials are present.

* * * * *

UNITED STATES PATENT AND TRADEMARK OFFICE
CERTIFICATE OF CORRECTION

PATENT NO. : 5,488,018
DATED : January 30, 1996
INVENTOR(S) : Santosh Y. Limaye

It is certified that error appears in the above-indentified patent and that said Letters Patent is hereby corrected as shown below:

In col. 2, line 35, insert a period after "No";

In col. 4, line 18, change "$2XSi_{2X}O_{24}$" to $-_{2X}Si_{2X}O_{24}-$;

In col. 4, line 37, change the second equation "$Sr_{1+X}Zr_{4-2X}Y_2P_6O_{24}$" to $-Sr_{1+X}Zr_{4-2X}Y_{2X}P_6O_{24}-$;

In col. 4, line 39, change "$XSi_XO_{24}$" to $-_XSi_XO_{24}-$;

In col. 4, line 58, after "0.6" insert $--\pm--$;

In col. 5, line 59, change "$ZrOCl_2X$" to $--ZrOCl_2\ X--$;

In col. 8, line 45, change "$ZrP_{2O7}$" to $--ZrP_2O_7--$;

In col. 10, lines 33 and 48, after "expansion" insert --and--;

On the title page, the Assignee should be listed as --Ceramatec, Inc., Salt Lake City, Utah-- and the Attorney, Agent or Firm should be --Trask, Britt & Rossa--.

Signed and Sealed this

Nineteenth Day of November, 1996

*Attest:*

BRUCE LEHMAN

*Attesting Officer*   *Commissioner of Patents and Trademarks*